United States Patent
Looks et al.

(10) Patent No.: US 12,053,910 B2
(45) Date of Patent: Aug. 6, 2024

(54) INDUCTION HEATED TOOL SYSTEM FOR HARDENING POLYMER-FIBER COMPONENTS

(71) Applicant: Airbus Operations GmbH, Hamburg (DE)

(72) Inventors: Jan Looks, Hamburg (DE); Sebastian Kerger, Hamburg (DE); Paulin Fideu Siagam, Hamburg (DE); Konstantin Schubert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 21 days.

(21) Appl. No.: 17/826,254

(22) Filed: May 27, 2022

(65) Prior Publication Data

US 2022/0379526 A1 Dec. 1, 2022

(30) Foreign Application Priority Data

May 31, 2021 (EP) .................. 21176990

(51) Int. Cl.
*B29C 35/08* (2006.01)
*B29C 33/06* (2006.01)
(Continued)

(52) U.S. Cl.
CPC .......... *B29C 35/0805* (2013.01); *B29C 33/06* (2013.01); *B29C 35/002* (2013.01); *H05B 6/105* (2013.01); *B29C 2035/0811* (2013.01)

(58) Field of Classification Search
CPC ..... B29C 2035/0811; B29C 2035/0816; B29C 33/06; B29C 35/002; B29C 35/0805; H05B 2206/023; H05B 6/105; H05B 6/14
See application file for complete search history.

(56) References Cited

U.S. PATENT DOCUMENTS

2005/0035115 A1\* 2/2005 Anderson ........... B29C 35/0805
219/759
2017/0095986 A1 4/2017 Feigenblum et al.
(Continued)

OTHER PUBLICATIONS

European Search Report for Application No. 21176991 dated Nov. 18, 2021.

*Primary Examiner* — Philip C Tucker
*Assistant Examiner* — Jimmy R Smith, Jr.
(74) *Attorney, Agent, or Firm* — KDW Firm PLLC

(57) ABSTRACT

An induction heated tool system for receiving and heating polymer-fiber components from a starting temperature to a target temperature includes a tool part having a receiving cutout, the tool part formed from a thermally dimensionally stable material so it has a coefficient of thermal longitudinal expansion less than $10 \times 10^{-6}$ K$^{-1}$, or less than $5 \times 10^{-6}$ K$^{-1}$, or less than $4 \times 10^{-6}$ K$^{-1}$ in the plane of the largest dimension of the receiving cutout, at temperatures between the starting and target temperatures. A receiving cutout for receiving a polymer-fiber component is in the tool part, the receiving cutout delimited by a receiving surface portion so a polymer-fiber component received in the receiving cutout can lie against the receiving surface portion. A susceptor element includes a ferromagnetic material with a first Curie temperature. The susceptor element is on a surface portion of the tool part outside the receiving cutout and the receiving surface portion.

20 Claims, 2 Drawing Sheets

(51) Int. Cl.
*B29C 35/00* (2006.01)
*H05B 6/10* (2006.01)

(56) References Cited

U.S. PATENT DOCUMENTS

2019/0289681 A1* 9/2019 Matsen .................... B22F 7/04
2019/0380174 A1  12/2019 Hull et al.

* cited by examiner

INDUCTION HEATED TOOL SYSTEM FOR HARDENING POLYMER-FIBER COMPONENTS

CROSS-REFERENCE TO RELATED APPLICATION

This application claims priority to European Patent Application 21176990.6 filed May 31, 2021, the entire disclosure of which is incorporated by reference herein.

TECHNICAL FIELD

The disclosure herein relates to an induction heated tool system for receiving and for heating polymer-fiber components from a starting temperature to a target temperature, having at least one tool part which is formed from a thermally dimensionally stable material.

BACKGROUND

The prior art discloses tool systems which make it possible to harden polymer-fiber components comprising a polymer as matrix material, which polymer must be heated to temperatures in the range of 140-180° C. and in exceptional cases even up to 400° C. for hardening purposes. For this, tool systems of this type comprise tool parts having cutouts in which the polymer-fiber component to be heated can be received such that it lies against contact surfaces of the tool parts there.

In particular in the field of aviation technology, there is the resulting problem that the polymer-fiber components used in this field must be heated during hardening for the one part very uniformly, i.e. with only very low temperature gradients as seen over the component, in order to ensure sufficient quality for aviation requirements. It is necessary in this respect that the temperature differences prevailing on the contact surface of the tool parts are very low and the respective tool part and in particular its contact surface is heated very uniformly.

For the other part, a further requirement is that the tool parts in which the cutouts for receiving the polymer-fiber component are made thermally expand only to an extent adapted to the component during the heating for hardening purposes, or only contract again correspondingly during the subsequent cooling operation, in order to ensure that during the cooling process no great pressure is exerted on the hardened component, which could result in damage to the polymer-fiber component.

Lastly, it is desirable that the tool parts used have a comparatively low weight and are therefore easy to handle. This is especially important in particular in the case of the large components produced in the aviation field. In order to achieve this aim, it has proven to be advantageous to heat the tool parts not using a heating medium, such as oil or the like, for example, which is guided through ducts within the tool parts, but instead to use inductors and to bring the tool parts to the desired temperatures inductively by inducing eddy currents.

In the case of this technique, in order to prevent individual regions of the tool parts, and in particular their contact surfaces with which the tool parts come into contact with the polymer-fiber component to be hardened, from being brought to excessively high temperatures, the prior art additionally discloses the use of a ferromagnetic material having a Curie temperature substantially corresponding to the temperature to which the polymer-fiber component must he heated as material which comes into contact with the polymer-fiber components and in particular forms the contact surface. Since a ferromagnetic material of this type therefore loses its ferromagnetic properties and takes up electrical energy radiated in by an inductor to a considerably smaller extent approximately at the temperature to which the polymer-fiber component is to be heated, what happens is that, in the case of tool parts structured in this way, the contact surfaces are not heated beyond the temperature to which the polymer-fiber component should be heated. A tool part with contact surfaces based on a ferromagnetic material having a Curie temperature corresponding to the hardening temperature for the polymer component is therefore self-regulating in a sense, in that the contact surfaces prevent themselves from heating to excessively high temperatures in spite of further irradiation with electromagnetic energy.

However, it has been found that, for tool parts formed from a ferromagnetic material with a certain Curie temperature, the coefficients of thermal expansion and in particular coefficients of longitudinal expansion greatly increase in the vicinity of the Curie temperature. This has the result that tool parts of this type, the Curie temperature of which is selected corresponding to the hardening temperature, indeed expand to a great extent close to this temperature and inversely, during cooling, then also contract to a great extent again, this being extremely disadvantageous for the reasons mentioned at the outset.

SUMMARY

Proceeding from the prior art, it is therefore an object of the disclosure herein to provide an induction heated tool system for receiving and for heating polymer-fiber components, in the case of which the contact surface of the cutout for receiving a polymer-fiber component is prevented from being heated non-uniformly and to excessively high temperatures, and which is also thermally dimensionally stable in the region of the cutout.

According to the disclosure herein, this object is achieved by an induction heated tool system for receiving and for heating polymer-fiber components from a starting temperature to a target temperature, having at least one tool part, wherein at least one receiving cutout for receiving a polymer-fiber component is formed in the tool part, wherein the receiving cutout is delimited by a receiving surface portion of the tool part, with the result that a polymer-fiber component received in the receiving cutout can lie against the receiving surface portion. The tool part is formed from a thermally dimensionally stable material so that the tool part has a coefficient of thermal longitudinal expansion which is less than $10 \times 10^{-6}$ $K^{-1}$, preferably less than $5 \times 10^{-6}$ $K^{-1}$, and further preferably less than $4 \times 10^{-6}$ $K^{-1}$, in the plane of the largest dimension of the receiving cutout, preferably in all directions of extent of the receiving cutout, at temperatures in the range between the starting temperature and the target temperature.

The tool system according to the disclosure herein also has at least one susceptor element comprising a ferromagnetic material which has a first Curie temperature corresponding to the target temperature, wherein the susceptor element is arranged on a surface portion of the tool part that lies outside the receiving cutout and the receiving surface portion.

Lastly, at least one induction device is provided, which is designed to generate an alternating magnetic field at least in the region in which the at least one susceptor element is arranged.

A tool system according to the disclosure herein accordingly has at least one tool part, in which a cutout is formed which is delimited by a receiving surface portion of the tool part, with the result that a polymer-fiber component to be hardened can be received in the cutout in such a way that it lies against the receiving surface portion. The material of the tool part is selected in this case in such a way that the tool part has a coefficient of thermal longitudinal expansion which is less than $10 \times 10^{-6}$ $K^{-1}$, preferably less than $5 \times 10^{-6}$ $K^{-1}$, and further preferably less than $4 \times 10^{-6}$ $K^{-1}$, in any case in the plane of the largest dimension of the receiving cutout at temperatures in the range between the starting temperature and the target temperature. This requirement for the coefficients of longitudinal expansion preferably applies for all directions of extent of the receiving cutout. This means that any desired materials may be used as material of the tool part, provided that they meet the abovementioned condition in terms of the coefficients of expansion, that is to say deforms only to a small extent in the region in which the tool part is heated during the hardening process.

Also provided according to the disclosure herein is at least one susceptor element, which is arranged outside the receiving cutout and spaced apart from the receiving surface portion on the tool part, i.e. lies against it, and has the best possible thermal contact with the tool part. In this respect, the susceptor element is formed from a ferromagnetic material and has a Curie temperature corresponding to the target temperature to which the polymer-fiber component to be received in the receiving cutout should be heated.

Lastly, an induction device is provided which is designed to generate an alternating magnetic field in the region in which the susceptor element is arranged.

The tool system according to the disclosure herein therefore operates in such a way that the susceptor element is heated using the induction device, and the susceptor element then in turn transfers the thermal energy to the tool part by way of the receiving cutout. Since the tool part with the receiving cutout provided in it is formed from a thermally dimensionally stable material, the polymer-fiber component provided in the receiving cutout cannot be exposed to compressive forces during the heating or during the cooling and cannot be damaged. Furthermore, the susceptor element with the Curie temperature selected according to the disclosure herein prevents the susceptor elements being heated beyond a temperature corresponding to the target temperature for the polymer-fiber component which is to be hardened. This results in turn in the tool part itself also not being heated above this temperature. The system is therefore also consistently self-regulating.

The system according to the disclosure herein also makes it possible for the susceptor elements to be able to be arranged suitably on the surface of the tool part outside the receiving surface portion such that it is precisely those regions of the tool part that release thermal energy back to the polymer-fiber component or the surrounding area to a large extent and would not reach the desired temperature without additional susceptor elements that are especially heated by way of the contact with the susceptor elements. The susceptor elements arranged on the surface of the tool part according to the disclosure herein therefore make it possible to spatially control the input of heat energy into the tool part in which susceptor elements are attached to the required regions.

In a preferred embodiment, the at least one tool part is formed from a metal paramagnetic material. Materials of this type have good heat conductivity, which is advantageous. This may be a question in particular of an Invar material and especially Invar 36. Furthermore, they take up energy to a moderate extent through the alternating magnetic field generated by the induction device.

As an alternative, it is also possible that the tool part is formed from a metal ferromagnetic material, wherein its Curie temperature is above the target temperature. The selection of such a material for the tool part ensures that it is thermally dimensionally stable in the desired temperature range between the starting temperature and the target temperature, it nevertheless having good thermal conductivity.

In a further preferred embodiment, the at least one susceptor element in addition to the one ferromagnetic material comprises a further ferromagnetic material which has a second Curie temperature below the first Curie temperature. In an embodiment of this type, the at least one susceptor element is composed of multiple ferromagnetic materials, which have different Curie temperatures. This has the effect that initially, at temperatures below the first Curie temperature, the susceptor element takes up energy from the radiated-in alternating electromagnetic field to a large extent, thereby leading to quick heating of the tool part. If its temperature, and therefore also that of the susceptor element, is increased above the second Curie temperature, less energy is absorbed by the susceptor element and the temperature increase in the tool part is smaller. Lastly, if the first Curie temperature is reached, in fact no more energy is absorbed, and the heating action on account of the susceptor element stops. Consequently, the provision of a second ferromagnetic material makes it possible to further control the temperature increase in the tool part.

In order to ensure good heat transfer into the tool part, it is further preferred when the at least one susceptor element comprises a material with high thermal conductivity, preferably copper.

In particular, it is preferred when the at least one susceptor element is formed from particles of ferromagnetic material and from a matrix material. In this embodiment, the shape of the susceptor element can be easily adapted to the conditions of that region of the surface in which the susceptor element should be attached. The matrix material is further preferably a thermoplastic material with a melting temperature above the first Curie temperature. Such a selection of the thermoplastic material ensures that the susceptor element does not lose its shape throughout the normal operating range of the tool system. On the other hand, however, susceptor elements of this type can be produced simply, since thermoplastic material can be processed easily.

In a further preferred embodiment, the at least one tool part has a main portion in which the receiving cutout is made, wherein rib elements are provided which extend away from a surface portion of the main portion that lies outside the receiving cutout and the receiving surface portion, wherein at least one free space, in which the induction device is arranged, is formed between the rib elements, and wherein the at least one susceptor element is fastened to that portion of the surface of the main portion that delimits the free space. In this embodiment, the rib elements attached to the main portion ensure that the main portion cannot deform, which in turn makes it possible to select the wall thickness of the main portion as smaller, with the result that the mass of the tool part is comparatively low. Furthermore, the lower wall thickness of the main portion results in it reacting more quickly to temperature changes of the susceptor element, with the result that temperature changes of the tool part can also be brought about more quickly. Lastly, the rib elements serve to form a standing surface and a contact surface for a press, by way of which the tool part is kept shut during the hardening process.

In a further preferred embodiment, in addition to the first susceptor element, yet a further susceptor element is provided which likewise has a first Curie temperature corresponding to the target temperature, wherein the further susceptor element is provided on a surface of one of the rib elements that faces the free space. In an embodiment of this type, a first susceptor element and a further susceptor element are provided in the free space, with the result that it is possible to heat not only the main portion directly by way of a susceptor element, but also the rib element to which the at least one further susceptor element is attached. This makes it possible to prevent heat energy flowing from the main portion into the rib element via the connecting region between the main portion and the rib element and the main portion being heated to a lesser extent in this region.

For good thermal coupling, it is preferred when the at least one susceptor element is connected to the tool part in the region of its center point by way of a fastening element. As an alternative, it is also possible for a material bond, such as a welded or soldered connection, for example, with the tool part to be provided. Further preferably, a deformable heat conductor, such as heat conducting paste, for example, is provided additionally between the susceptor element and the tool part.

Lastly, in a preferred embodiment, the tool system may have a multiplicity of susceptor elements, which in turn comprise a ferromagnetic material having a first Curie temperature corresponding to the target temperature, wherein the multiplicity of susceptor elements are arranged on a surface portion of the tool part, wherein the multiplicity of susceptor elements are attached to the surface portion adjacent to one another, and wherein gaps are provided between the susceptor elements of the multiplicity of susceptor elements. In a structure of this type, a large-area portion of the surface of the tool part may be provided with susceptor elements. This in turn makes it possible for heat to be able to be input into the tool part over a large area, wherein the gaps between the individual susceptor elements prevent the thermal expansion of the susceptor elements close to the Curie temperature leading to problems.

BRIEF DESCRIPTION OF THE DRAWINGS

The disclosure herein will be explained below on the basis of a drawing showing a preferred example embodiment, in which.

DETAILED DESCRIPTION

Figure 1:
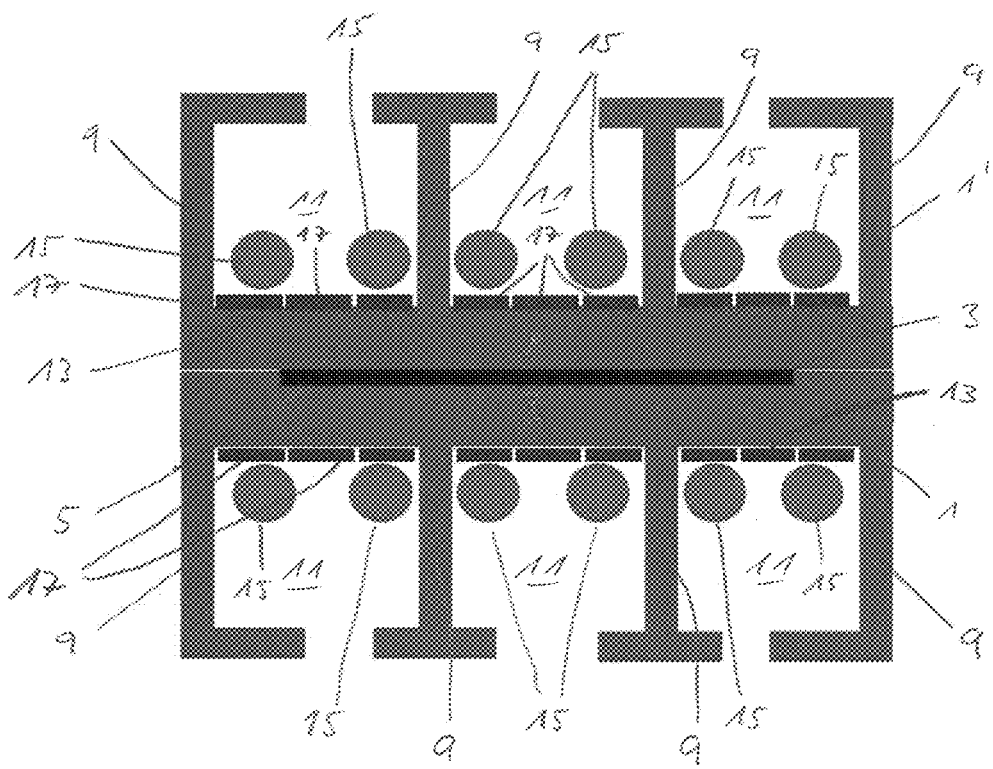
FIG. 1 shows a schematic illustration of a first example embodiment of a tool system according to the disclosure herein.

FIG. 1 shows a schematic cross-sectional view of an example embodiment of a tool system according to the disclosure herein, in which it can be seen that the tool system has two tool parts 1, 1', wherein in the first tool part 1 a receiving cutout 3 is provided which is designed to receive a polymer-fiber component, not illustrated in the figures, which is heated from a starting temperature T1 to a target temperature T2 by the tool system, in order to harden this polymer-fiber component or its polymer matrix material.

As can also be seen in FIG. 1, the cutout 3 has a receiving surface portion 5, which delimits the receiving cutout 3 and against which lies a polymer-fiber component received in the receiving cutout 3, when it is heated by the tool system. During the heating operation, the second tool part 1' faces the receiving cutout 3 and in particular lies against that side of the polymer-fiber component which faces away from the receiving surface portion 5.

As can also be seen in FIG. 1, the first tool part 1 has a main portion 7, in which the receiving cutout 3 is made. Rib elements 9 extend away from the main portion 7. The rib elements 9 are provided on surface portions of the main portion 7 which lie outside the receiving surface portion 5 and in particular are remote from the receiving cutout 3. In the example embodiment illustrated here, the rib elements 9 are provided on a surface region of the main portion 7 that faces the surface of the main portion 7 against which the second tool part 1' lies. The rib elements 9 serve, among other things, to form by way of their free ends a standing surface and a contact surface for a press, by way of which the tool part 1 is kept shut during the hardening process. It can also be seen in FIG. 1 that free spaces 11 are formed between the rib elements 9 and are delimited by the rib elements 9 and a surface 13 of the main portion 7.

The second tool part 1' has a quite similar form to the first tool part 1 and likewise has rib elements 9 which extend from the main portion 7 and likewise form free spaces 11 between them, which in turn are delimited by the rib element 9 and a surface 13 of the main portion 7.

In the example embodiment described here, the tool parts 1, 1' are formed from a metal paramagnetic material. The material of the tool parts 1, 1' is selected in this case in such a way that the tool parts 1, 1' have a coefficient of thermal longitudinal expansion which is less than $10 \times 10^{-6}$ $K^{-1}$, preferably less than $5 \times 10^{-6}$ $K^{-1}$, and further preferably less than $4 \times 10^{-6}$ $K^{-1}$, in any case in the plane of the largest dimension of the receiving cutout 3 at temperatures in the range between the starting temperature T1 and the target temperature T2. This requirement for the coefficients of longitudinal expansion preferably applies for all directions of extent of the receiving cutout 3.

However, it is also conceivable that the material of the tool parts 1, 1' is formed from a metal ferromagnetic material, the Curie temperature of the metal ferromagnetic material being above the target temperature T1. However, other materials are also conceivable.

In any case, however, the material of the tool parts 1, 1' has the above-mentioned low thermal expansion in the temperature range mentioned, such that the material of the tool parts 1, 1' is thermally dimensionally stable.

Induction devices 15, which in the example embodiment illustrated here have copper strands and devices for supplying alternating current, not illustrated in the figures, so that the copper strands generate an alternating electromagnetic field, are attached in the free spaces 11 of the first and the second tool part 1, 1'.

Furthermore, susceptor elements 17, which are attached to a surface of the main portion 7 that is remote from the receiving surface portion 5 and is additionally likewise spaced apart from the receiving cutout 3, are provided in the free spaces 11 in addition to the induction devices 15. The susceptor elements 17 are in this case arranged in the region subjected to an alternating electromagnetic field by the induction devices 15.

The susceptor elements 17 are based on a ferromagnetic material which has a first Curie temperature corresponding to the target temperature to which the polymer-fiber elements in the receiving cutout 3 of the first tool part 1 are to be heated in order to be hardened. In this context, the susceptor elements 17 may be constructed in one piece from material of this type. However, it is also possible that the susceptor elements 17 additionally comprise a further ferromagnetic material which has a second Curie temperature below the first Curie temperature. In this case, it is possible, as already described, to control the temperature increase taking place in the susceptor elements 17 when they are subjected to the alternating electromagnetic field from the induction device 15 such that the temperature increase then falls with increasing temperature when the second Curie temperature is reached or exceeded.

In addition, it is possible that the susceptor elements 17 comprise a material with high thermal conductivity, such as copper, for example. This has the effect that the heat energy generated in the susceptor elements 17 by the interaction with the electromagnetic field can be conducted efficiently to the tool parts 1, 1'. In particular when the susceptor elements 17 are formed from multiple materials, it is possible to provide particles made of ferromagnetic material together with a matrix material, it being possible for the matrix material to be a thermoplastic material which has a melting temperature above the first Curie temperature.

In order to fasten the susceptor elements 17, they may be connected to the tool part 1, 1' in the region of their center point by way of a fastening element. However, it is also possible that the susceptor elements 17 are connected to the tool part 1, 1' in the region of their center point by way of a material bond, such as a welded or soldered connection. In these cases, it is possible to provide a deformable heat conductor between the susceptor element 17 and the tool part 1, 1' for the purpose of improving the heat conduction between the susceptor elements 17 and the respective tool part 1, 1'.

The first example embodiment of the tool system operates in such a way that the susceptor elements 17 are heated using the induction devices 15, with the result that the thermal energy is then transmitted to the tool parts 1, 1' by way of the receiving cutout 3. Since the tool part 1 with the receiving cutout 3 provided in it is formed from a thermally dimensionally stable material, the polymer-fiber component provided in the receiving cutout 3 cannot be exposed to compressive forces during the heating or during the cooling and cannot be damaged.

The susceptor elements 17 with the Curie temperature selected according to the disclosure herein also prevent the susceptor elements 17 from being heated beyond a temperature corresponding to the target temperature T2 for the polymer-fiber component which is to be hardened. This results in turn in the tool parts 1, 1' themselves also not being heated above this temperature, and the system is thus self-regulating.

The system also allows the susceptor elements 17 to be able to be arranged suitably on the surface of the tool parts 1, 1' outside the receiving surface portion 5 such that it is precisely those regions of the tool parts 1, 1' that release thermal energy back to the polymer-fiber component or the surrounding area to a large extent and would not reach the desired temperature without additional susceptor elements 17 that are especially heated by way of the contact with the susceptor elements 17. The susceptor elements 17 arranged on the surface 13 of the tool part 1, 1' according to the disclosure herein therefore make it possible to spatially control the input of heat energy into the tool parts 1, 1' in which susceptor elements 17 are attached to the required regions.

Figure 2:
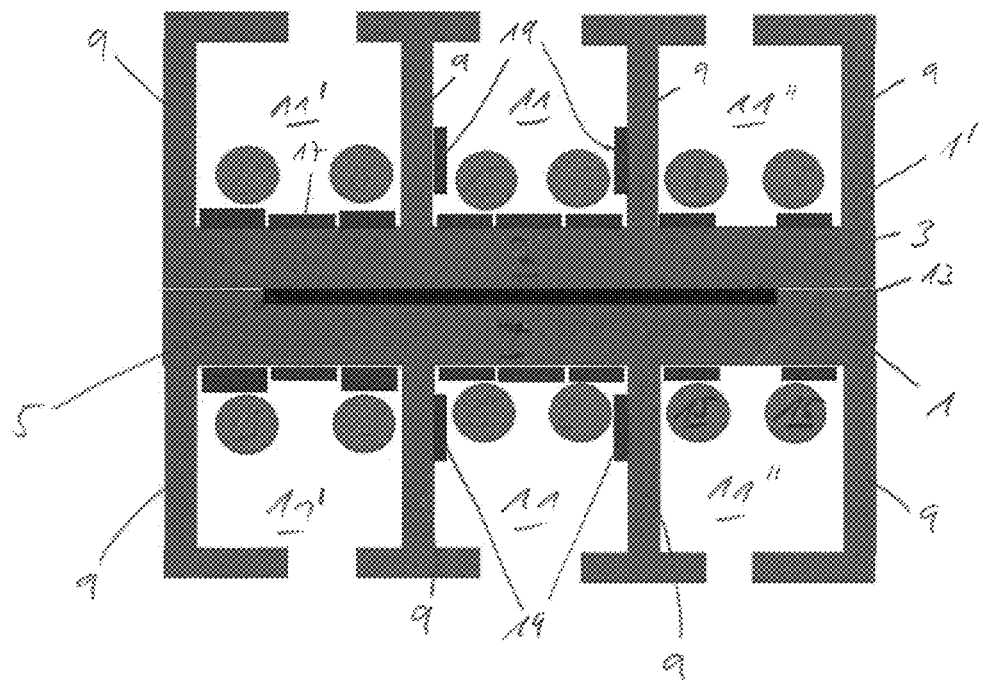
FIG. 2 shows a schematic illustration of a second example embodiment of a tool system according to the disclosure herein.

The second example embodiment, shown in FIG. 2, of an induction heated tool system according to the disclosure herein has a substantially identical construction to that of FIG. 1. In this instance, by way of example, options are shown as to how the susceptor elements 17 can be formed and arranged in order to further adapt the input of heat energy into the tool parts 1, 1'. In a part of the free spaces 11, in addition to the susceptor elements 17 attached to a surface 13 of the main portion 7, further susceptor elements 19 are provided, which are fastened to the rib elements 9, these further susceptor elements 19 likewise being arranged in the region subjected to load by the induction devices 15. Therefore, the rib elements 9 are subjected to thermal energy by these further susceptor elements 19 and correspondingly heated, such that the rib elements 9 are prevented from acting as cold bridges.

In further free spaces 11', the susceptor elements 17 are attached to the surface 13 with different thicknesses, in order to adapt the intensity of the coupling into the susceptor elements 17 such that the input of the thermal energy into the surface 13 is homogenized, even though the susceptors 17 are at different distances from the induction devices 15.

Lastly, in other free spaces 11", it is also possible not to provide parts of the surface 13 with susceptors 17, in order to introduce less or no thermal energy in these parts.

Figure 3:
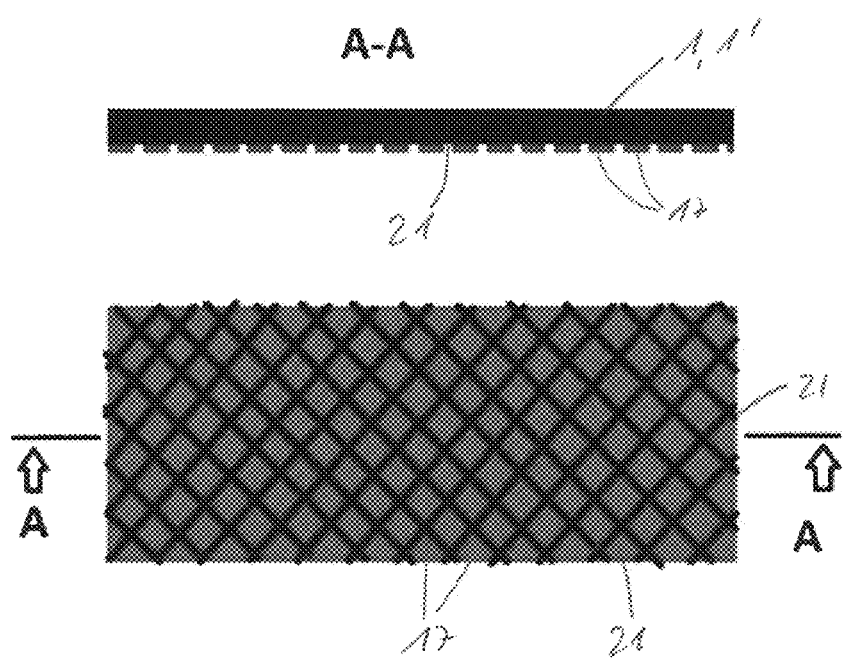
FIG. 3 shows a plan view and a cross-sectional view of an example embodiment of an arrangement of susceptor elements for a tool system according to the disclosure herein.

Lastly, FIG. 3 shows an arrangement of susceptor elements 17 for one example embodiment of a tool system according to the disclosure herein, in which a multiplicity of susceptor elements 17 comprising a ferromagnetic material which has a first Curie temperature corresponding to the target temperature is provided, wherein the multiplicity of susceptor elements 17 may be arranged on a surface portion of the tool part 1. The multiplicity of susceptor elements 17 are attached to the surface portion of the tool part 1, 1' adjacent to one another, gaps 21 being provided between the susceptor elements 17. This arrangement also makes it possible to heat large-area regions of the surface of the tool parts 1, 1', the gaps 21 preventing stresses from building up in the arrangement in the vicinity of the target temperature T2.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1, 1' Tool part
3 Receiving cutout
5 Receiving surface portion
7 Main portion
9 Rib element 11, 11', 11" Free space
13 Surface portion-main portion
15 Induction device
17 Susceptor element
19 Further susceptor element
21 Gap

The invention claimed is:

1. An induction heated tool system for receiving polymer-fiber components and for heating the polymer-fiber components from a starting temperature to a target temperature, the induction heated tool system comprising:
at least one tool part that has at least one receiving cutout formed in the tool part for receiving a polymer-fiber component of the polymer-fiber components therein, wherein the receiving cutout is delimited by a receiving surface portion of the tool part, such that the polymer-fiber component received in the receiving cutout can lie against the receiving surface portion;
at least one susceptor element comprising a ferromagnetic material, which has a first Curie temperature corresponding to the target temperature, wherein the at least one susceptor element is on a surface portion of the tool part that lies outside the receiving cutout and the receiving surface portion; and
at least one induction device configured to generate an alternating magnetic field at least in a region where the at least one susceptor element is disposed;
wherein the tool part is formed from a thermally dimensionally stable material so that the tool part has a coefficient of thermal longitudinal expansion of less than $10 \times 10^{-6}$ $K^{-1}$, in a plane defined in part by a direction of a largest dimension of the receiving cutout, at temperatures in a range between the starting temperature and the target temperature.

2. The induction heated tool system according to claim 1, wherein the at least one tool part is formed from a metal paramagnetic material.

3. The induction heated tool system according to claim 1, wherein the at least one tool part is formed from a metal ferromagnetic material, and
wherein the Curie temperature of the metal ferromagnetic material is above the target temperature.

4. The induction heated tool system according to claim 1, wherein the at least one susceptor element comprises a further ferromagnetic material which has a second Curie temperature below the first Curie temperature.

5. The induction heated tool system according to claim 1, wherein the at least one susceptor element comprises a material with high thermal conductivity, and/or copper.

6. The induction heated tool system according to claim 1, wherein the at least one susceptor element is formed from particles of the ferromagnetic material and from a matrix material.

7. The induction heated tool system according to claim 6, wherein the matrix material is a thermoplastic material which has a melting temperature above the first Curie temperature.

8. The induction heated tool system according to claim 1, wherein the at least one tool part has a main portion in which the receiving cutout is made,
wherein rib elements extend away from a surface portion of the main portion that lies outside the receiving cutout and the receiving surface portion,
wherein at least one free space, in which the at least one induction device is disposed, is formed between the rib elements, and
wherein the at least one susceptor element is fastened to a portion of a surface of the main portion that delimits the free space.

9. The induction heated tool system according to claim 8, comprising at least one further susceptor element comprising a ferromagnetic material which has a first Curie temperature corresponding to the target temperature, and
wherein the further susceptor element is on a surface of one of the rib elements that faces the free space.

10. The induction heated tool system according to claim 1, wherein the at least one susceptor element is connected to the tool part in a region of its center point by way of a fastening element.

11. The induction heated tool system according to claim 10, wherein a deformable heat conductor is between the at least one susceptor element and the tool part.

12. The induction heated tool system according to claim 1, wherein the at least one susceptor element is connected to the tool part in a region of its center point by way of a material bond.

13. The induction heated tool system according to claim 12, wherein a deformable heat conductor is between the at least one susceptor element and the tool part.

14. The induction heated tool system according to claim 12, wherein the at least one tool part is a first tool part, the induction heated tool system comprising a second tool part.

15. The induction heated tool system according to claim 14, wherein the second tool part is oriented, relative to the first tool part, to face the receiving cutout of the first tool part and to lie against a side of the polymer-fiber component that faces away from the receiving surface portion when the polymer-fiber component is within the receiving cutout.

16. The induction heated tool system according to claim 15, wherein the second tool part comprises at least one susceptor element comprising a ferromagnetic material, which has the first Curie temperature corresponding to the target temperature, wherein the at least one susceptor element is on a surface portion of the second tool part that is opposite a side of the second tool part that faces the receiving cutout of the first tool part.

17. The induction heated tool system according to claim 16, wherein the second tool part comprises at least one induction device configured to generate an alternating magnetic field at least in a region where the at least one susceptor element is disposed.

18. The induction heated tool system according to claim 14, wherein the second tool part comprises;
at least one susceptor element comprising a ferromagnetic material, which has the first Curie temperature corresponding to the target temperature, wherein the at least one susceptor element is on a surface portion of the second tool part that is opposite a side of the second tool part that faces the receiving cutout of the first tool part; or
at least one induction device configured to generate an alternating magnetic field at least in a region where the at least one susceptor element is disposed.

19. The induction heated tool system according to claim 1, comprising a multiplicity of susceptor elements comprising a ferromagnetic material, which has a first Curie temperature corresponding to the target temperature, wherein:
the multiplicity of susceptor elements are on a surface portion of the tool part;
wherein the multiplicity of susceptor elements are attached to the surface portion adjacent to one another; and wherein gaps are between the susceptor elements of the multiplicity of susceptor elements.

20. An induction heated tool system for receiving polymer-fiber components and for heating the polymer-fiber components from a starting temperature to a target temperature, the induction heated tool system comprising:
- at least one tool part that has at least one receiving cutout formed in the tool part for receiving a polymer-fiber component of the polymer-fiber components therein, wherein the receiving cutout is delimited by a receiving surface portion of the tool part, such that the polymer-fiber component received in the receiving cutout can lie against the receiving surface portion;
- at least one susceptor element comprising a ferromagnetic material, which has a first Curie temperature corresponding to the target temperature, wherein the at least one susceptor element is on a surface portion of the tool part that lies outside the receiving cutout and the receiving surface portion; and
- at least one induction device configured to generate an alternating magnetic field at least in a region where the at least one susceptor element is disposed;
- wherein the tool part is formed from a thermally dimensionally stable material so that the tool part has a coefficient of thermal longitudinal expansion of less than $10 \times 10^{-6}$ $K^{-1}$, in all directions of extent of the receiving cutout, at temperatures in a range between the starting temperature and the target temperature.

* * * * *